(12) United States Patent
Muenter

(10) Patent No.: US 7,006,542 B2
(45) Date of Patent: Feb. 28, 2006

(54) SYSTEM AND METHOD FOR STABILIZING A LASER OUTPUT FREQUENCY

(75) Inventor: Steven E. Muenter, Van Nuys, CA (US)

(73) Assignee: The Boeing Company, Chicago, IL (US)

( * ) Notice: Subject to any disclaimer, the term of this patent is extended or adjusted under 35 U.S.C. 154(b) by 313 days.

(21) Appl. No.: 10/385,562

(22) Filed: Mar. 11, 2003

(65) Prior Publication Data

US 2004/0179561 A1    Sep. 16, 2004

(51) Int. Cl.
*H01S 3/13*        (2006.01)

(52) U.S. Cl. .......................................... 372/32; 372/18

(58) Field of Classification Search ................... 372/32, 372/30, 31, 29.01, 29.011, 29.015, 29.02
See application file for complete search history.

(56) References Cited

U.S. PATENT DOCUMENTS

| 5,204,640 A  * | 4/1993  | Logan, Jr. ...................... 331/9 |
| 5,500,762 A  * | 3/1996  | Uchiyama et al. .......... 359/326 |
| 6,144,483 A  * | 11/2000 | Allen et al. ................. 359/305 |
| 6,490,300 B1 * | 12/2002 | Nishioki et al. .............. 372/32 |
| 6,654,394 B1 * | 11/2003 | Sellin et al. .................. 372/32 |
| 6,850,543 B1 * | 2/2005  | Cundiff et al. ................ 372/18 |

* cited by examiner

*Primary Examiner*—Minsun Harvey
*Assistant Examiner*—Tuan N. Nguyen
(74) *Attorney, Agent, or Firm*—Thompson Coburn LLP

(57) ABSTRACT

A system and method for stabilizing the frequency of the optical output signal of a laser wherein the laser output signal is interfered with at least one time delayed version of said signal to produce an optical interference signal having a frequency shift proportional to the rate of optical frequency change of the laser. The interference signal is processed to produce a frequency correction signal representing the frequency drift of the laser output signal. The laser output signal is combined with the frequency correction signal to stabilize the frequency of the laser output signal.

21 Claims, 2 Drawing Sheets

SYSTEM AND METHOD FOR STABILIZING A LASER OUTPUT FREQUENCY

BACKGROUND OF THE INVENTION

The present invention is directed to a system and method for stabilizing the frequency of the optical output signal of a laser, and more specifically for stabilizing the output signal by applying a corrective signal to the output signal without modification to the internal laser cavity.

The frequency stability of lasers allows for their application in interferometry. In interferometry, the laser beam is split into two paths and then recombined. A difference in the optical path length between the two paths produces a differential phase shift between the two recombined beams. This phase shift modulates the intensity of the recombined beams where the maximum intensity is achieved when both beams are in phase, and minimum intensity occurs when the two beams are 180° out of phase. Information from the interferometer requires accurate measurement of this intensity to determine the differential phase. If the laser output is not stable in frequency, when the beams from two unequal paths are recombined, the frequency jitter of the laser will produce differential phase jitter in the recombined beams. The amplitude of the phase jitter increases with increasing frequency jitter and increasing difference in the optical path lengths of the two beams The frequency stability of a laser can be adversely affected by thermal effects, vibration, and other influences that are difficult and expensive to reduce or completely eliminate.

SUMMARY OF THE INVENTION

The present invention reduces the frequency jitter of a laser, allowing for more accurate phase detection and measurement even when the optical path lengths of the interferometer are very different. The system of the present invention is comprised of (1) a controllable optical frequency shifter, (2) an optical frequency differentiator, and (3) a control feedback loop. The controllable optical frequency shifter allows a corrective signal to be added to the optical frequency of a laser. Using the appropriate corrective signal, it is possible to compensate for drift in the laser frequency such that the laser output frequency remains substantially constant.

The optical frequency differentiator detects any change in the optical frequency. This is accomplished by interfering the optical frequency with a delayed version of itself. A time delayed laser output can be produced by passing the beam through a long, single mode fiber. The time delay is equal to the length of the fiber divided by the speed of light in the fiber. The output signal of the differentiator represents the rate of change of the optical output frequency, and is used as an error signal in the control feedback loop.

The control feedback loop processes the frequency drift error signal to generate a frequency correction signal. This frequency correction signal is inputted to the controllable optical frequency shifter to shift the optical frequency by an amount opposite to the detected drift. The action of the control feedback loop minimizes the amplitude of the error signal from the frequency differentiator, and therefore stabilizes the optical output frequency of the laser.

Further features and advantages of the present invention, as well as the structure and operation of various embodiments of the present invention, are described in detail below with reference to the accompanying drawings.

DETAILED DESCRIPTION OF PREFERRED EMBODIMENTS

Figure 1:
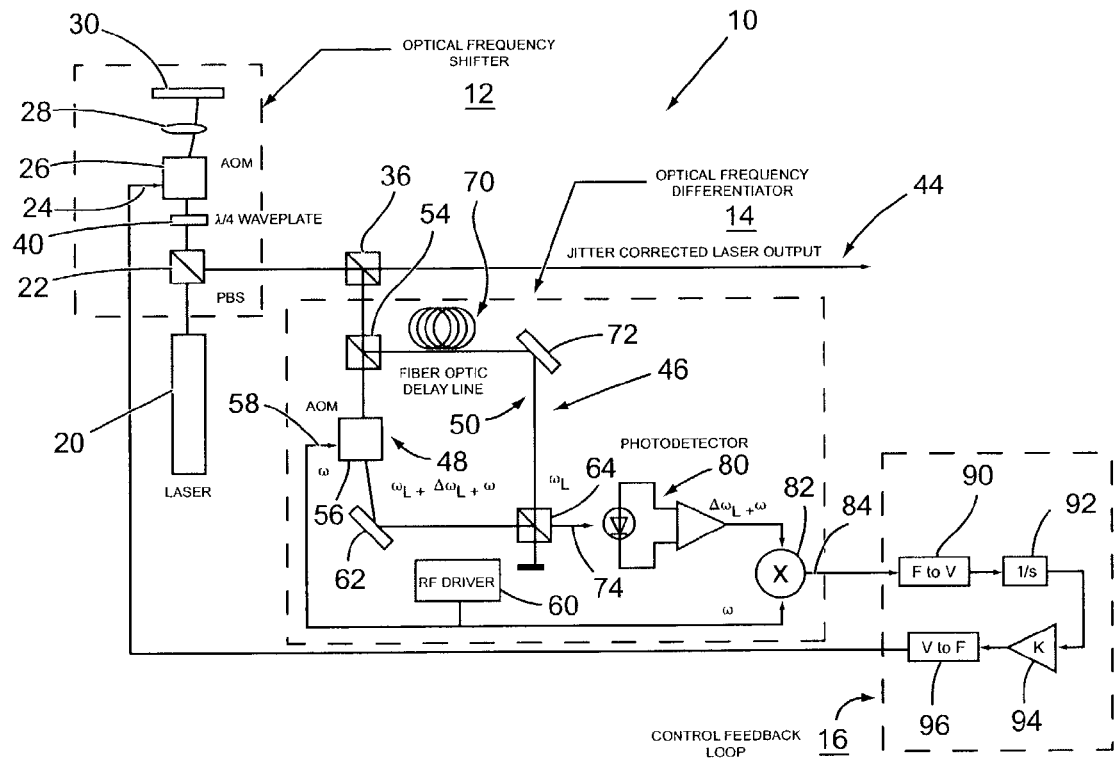
FIG. 1 is a schematic diagram of a laser optical output signal stabilization system of the present invention.

With reference to FIG. 1, there is shown a heterodyne implementation of a system 10 of the present invention for stabilizing the frequency of a laser optical output signal. Generally, the system 10 comprises an optical frequency shifter 12, an optical frequency differentiator 14, and a control feedback loop 16.

The optical frequency shifter 12 functions to allow a correction signal to be added to the optical output signal of the laser to cause a shift in the laser output frequency to compensate for drift in a laser output frequency, thereby producing a substantially constant laser output. In this described embodiment, the optical frequency shifter 12 is implemented by a single acousto-optic modulator (AOM) using a polarizing beam splitter to pass the laser output beam through the AOM twice. Thus, in accordance with this embodiment, the optical output signal of a linearly polarized laser 20 passes through a polarizing beam splitter (PBS) 22, then through a quarter wave waveplate 40 to produce a circularly polarized beam. This beams passes through an AOM 26 where the first diffracted order undergoes a frequency shift. This beam then passes through lens 28 to a mirror 30 where the direction of circular polarization of the beam is reversed. The beam is reflected by the mirror, back through the lens to the AOM where the first diffracted order undergoes a second frequency shift. The circularly polarized beam passed through the waveplate where it becomes linearly polarized in the orthogonal axis. The beam is reflected from the PBS, whereupon the polarized beam is directed to a non-polarizing beam splitter 36. The AOM 26 has an input 24 that receives a corrective signal to correct for drift or jitter in the laser output signal as will be further described.

The beam splitter 36 splits the beam from the PBS 22 with the majority of the beam signal directed to the jitter corrected laser output 44 upon which the stabilized laser output signal is produced. The beam splitter 36 directs a smaller portion of the beam signal to a Mach-Zender heterodyne interferometer 46 which provides two optical paths 48, 50, the path 50 producing a time-delayed version of the signal through the path 48. Thus, the split signal from the beam splitter 36 is fed to another beam splitter 54 which splits half the beam through the path 48 and half the beam through the delay path 50. The beam in the path 48 travels through an AOM 56 which has an input 58 that receives an RF drive signal from an RF drive 60. The first order diffracted output from the AOM is an optical having a frequency $\omega_L + \Delta\omega_L + \omega$, where $\omega_L$ is the frequency of the laser output signal, $\Delta\omega_L$ represents a change in the laser output frequency due to drift or jitter, and $\omega$ is the RF drive frequency. This signal is reflected as shown at 62 to one input of a beam combiner 64.

The other path 50 of the interferometer 46 includes a device for creating a delay in the optical signal traveling this path. In this described embodiment, the delay is created by fiber optic delay line 70. The time delay $\Delta t$ created in the optical path is equal to the length of the fiber of the delay line divided by the speed of light in the fiber. The beam from the delay line is reflected at 72 and directed to the other input of the beam combiner 64. At a particular instant of time, the optical signal through the path 50 is $\omega_L$. The beam combiner 64 produces at its output 74 an intensity modulated beam resulting from the combination of the signals through the paths 48 and 50, which is electrically detected by photodetector 80. The frequency of the intensity modulation is equal to $\omega$, the RF drive signal 60 to the AOM 56, plus the frequency drift of the laser $\Delta\omega_L$ during the time interval $\Delta t$.

Thus, the optical frequency drift information is encoded on the RF carrier frequency, and the drift error can be determined by comparing the frequency of the encoded RF carrier frequency to that of the reference RF frequency. The signal $\omega + \omega_L$ is fed to one input of a mixer 82, the other input of which receives the RF drive signal from the driver 60 which functions as a reference signal. The signal at the output 84 is the frequency difference between the two input signals, $\Delta\omega_L$, during the time interval $\Delta t$. This signal represents the rate of change of optical frequency, thus performing the function of an optical frequency differentiator.

The output 84 of the optical frequency differentiator 14 is fed to the control feedback loop 16. The output signal at 84 is converted to an analog voltage using a frequency-to-voltage converter 90. The voltage from the converter 90 represents the frequency drift of the laser, and is inputted to an integrator 92. The output of the integrator is multiplied at 94 by a gain factor, and the signal is then inputted to a voltage-to-frequency converter 96, the output of which is fed back to the input 24 of the AOM 26. Therefore, the signal from the voltage-to-frequency converter 96 becomes a frequency correction signal fed to the AOM 26 of the optical frequency shifter 12, whereupon the frequency correction signal is combined with the laser output signal to stabilize the frequency of the laser output signal, and thereby maintain the frequency of the laser output signal substantially constant.

In operation, at a given instant of time the frequency of the optical beam signal in the path 50 is $\omega L$. Assuming that during the delay generated by the delay path 50 the output of the laser 20 experiences a change $\Delta\omega_L$ in frequency, the optical signal in the path 48 is $\omega_L + \Delta\omega_L$ + the drive frequency $\omega$. The signal at the output 74 representing the recombined beams from the time delayed signal from the path 50 with the signal from the path 48 becomes an intensity modulated beam with modulation frequency $\Delta\omega_L$ proportional to the rate of optical frequency change of the laser. This signal is further processed by the control feedback loop 16 to produce a frequency correction signal representing the frequency drift of the laser output signal. This frequency correction signal is fed to the input 24 of the AOM 26 to be combined with the laser output signal to thereby correct for the frequency drift and stabilize the laser output signal. This process repeats to produce a substantially constant frequency laser output signal.

In practice, the output response of the optical frequency differentiator is insensitive to oscillatory frequency drifts when the delay time of the fiber optic delay line is a multiple of the period of the oscillation frequency. Several parallel optical frequency differentiators, each with a different delay time of the fiber optic delay line, can be used. The outputs of the multiple optical frequency differentiators may be summed to generate the error signal for the control feedback loop.

Although an analog implementation of the present invention has been described, it is to be understood that an implementation using digital signal processing techniques could also be used and is within the scope of the invention.

Figure 2:
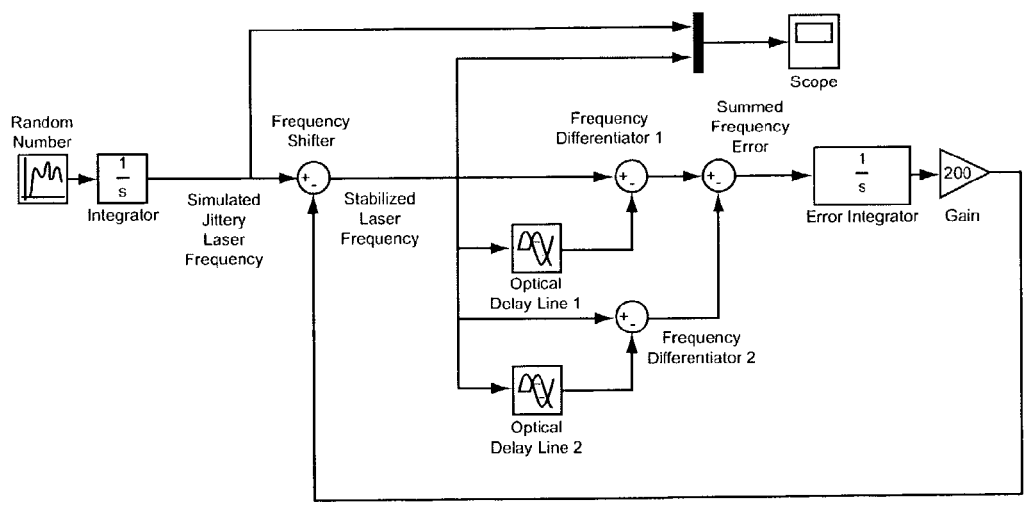
FIG. 2 is a diagram of a model of the system of the present invention.

The diagram of FIG. 2 shows a model of the system responding to a randomly drifting input frequency. Two optical frequency differentiators generate the frequency drift error signal for the control loop. The control loop has an integrator with gain. The output of the integrator represents a frequency correction signal that is used to arithmetically process the input frequency to compensate for any frequency drifts.

Figure 3:
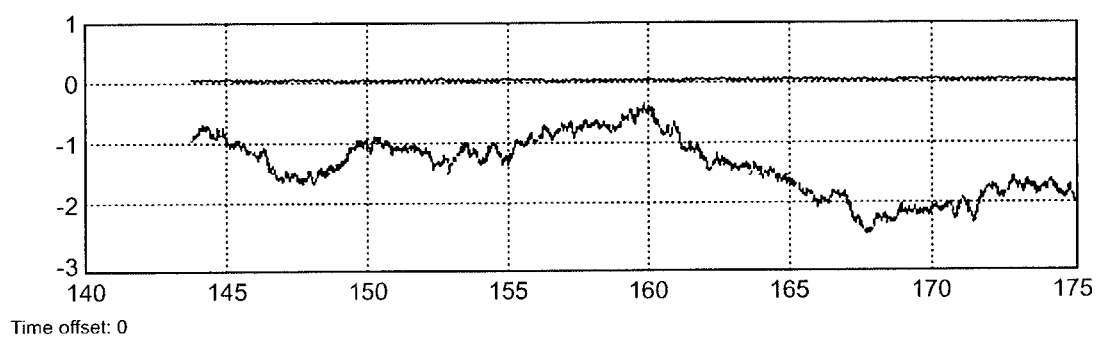
FIG. 3 is a plot showing the corrective action of the model of FIG. 2.

The plot of FIG. 3 shows the corrective action of the model. The lower trace shows the drifting input frequency and the upper trace shows the stabilized output frequency.

While the present invention has been described by reference to specific embodiments and specific uses, it should be understood that other configurations and arrangements could be constructed, and different uses could be made, without departing from the scope of the invention as set forth in the following claims.

What is claimed is:

1. A method for stabilizing the frequency of the optical output signal of a laser, the method comprising the steps of:
   accepting the laser output signal;
   accepting at least one time delayed version of said laser output signal;
   interfering the laser output signal with the time delayed version of said signal to produce an interference signal having a frequency shift proportional to the rate of optical frequency change of said laser,
   processing said interference signal to produce a frequency correction signal representing the frequency drift of said laser output signal;
   combining said laser output signal with said frequency correction signal;
   outputting a frequency stabilized laser output signal.

2. The method of claim 1 further comprising the steps of:
   interfering the laser output signal with multiple time delayed versions of said signal having different time delays to produce multiple interference signals, each having a frequency shift proportional to the rate of optical frequency change of said laser, and
   processing said interference signals to produce the frequency correction signal.

3. The method of claim 2 further comprising the steps of:
   summing said multiple interference signals, and
   processing said summed interference signals to produce said frequency correction signal.

4. The method of claim 1 further comprising the step of:
   comparing said interference signal with a reference signal for producing a frequency error signal representative of the frequency drift of said laser output signal.

5. The method of claim 1 further comprising the steps of:
   generating an RF drive signal,
   adding or subtracting said RF drive signal to the optical output frequency of said laser,
   combining said frequency shifted optical signal with said time delayed optical signal to produce an optical interference signal,
   detecting said interference signal to produce an electric signal representing said interference signal, and
   mixing said RF drive signal with said electric signal to produce said frequency error signal.

6. The method of claim 5 wherein said mixing step produces a frequency error signal, said method further comprising the steps of:
   converting said frequency error signal to an analog voltage representing the frequency error of said laser output signal, integrating said error voltage signal, and multiplying said integrated signal by a gain factor to produce said correction signal.

7. The method of claim 1 wherein the interfering step further comprises:

processing said laser output signal through at least one fiber optic delay line to produce said time delayed version of said signal.

8. The method of claim 1 wherein said processing step includes processing said interference signal through a feedback loop.

9. A system for stabilizing the frequency of the optical output signal of a laser, said system comprising:

an optical frequency differentiator including a first input for accepting said laser output signal and a device coupled to the first input for producing at least one time delayed version of said laser output signal, the optical frequency differentiator being configured and adapted for interfering the laser output signal with the time delayed version of said signal thereby producing an interference signal having a frequency shift proportional to the rate of optical frequency change of said laser, the optical frequency differentiator further including an output for outputting the interference signal; and an optical frequency shifter including a second input for accepting said laser output signal and a third input coupled to the output for accepting said interference signal, the optical frequency shifter being configured and adapted for shifting the frequency of said laser output signal in response to said interference signal to stabilize the frequency of said laser output signal.

10. The system of claim 9 further comprising:

a photodetector for detecting said optical interference signal and generating an electric signal representing said optical interference signal.

11. The system of claim 9 wherein said optical frequency differentiator further comprises a circuit generating a signal representative of said laser output signal, and a signal representative of a time delayed version of said laser output signal, and a combining device interfering said laser output signal with said time delayed signal to produce said interference signal.

12. The system of claim 11 wherein said circuit producing said time delayed version of said signal further comprises at least one fiber optic delayed line to produce said time delayed version of said signal.

13. The system of claim 11 wherein said circuit further comprises an AOM through which a signal representing the laser output signal passes for interference by said time delayed version.

14. The system of claim 13 further comprising:

an RF driver generating an RF drive signal, said RF drive signal outputted to said AOM to add the frequency of the RF drive signal to the frequency of the signal representing said laser output signal, a detector detecting said interference signal and producing an electric signal representing said interference signal, and a mixer mixing said RF drive signal with said electric signal to produce said frequency error signal.

15. The system of claim 11 further comprising a plurality of said circuits each generating a different time delayed version of said signal to produce multiple interference signals, each interference signal having a frequency shift proportional to the rate of optical frequency change of said laser, and a processor for processing said interference signals to produce the frequency correction signal.

16. The system of claim 15 further comprising a summation circuit summing said multiple interference signals to produce said frequency correction signal.

17. The system of claim 9 further comprising an AOM, said laser output signal traveling through said AOM to produce a stabilized output signal, said frequency correction signal being input to the AOM to shift the frequency of the laser output signal and thereby stabilize its frequency.

18. A system for stabilizing the frequency of the optical output signal of a laser, said system comprising:

a circuit including a first input for accepting said laser output signal, the circuit being configured and adapted for generating a signal representative of said laser output signal, and the circuit further including a device coupled to the first input signal, the device being for producing at least one signal representative of a time delayed version of said laser output signal, a combining device coupled to the circuit and being configured and adapted for interfering said laser output signal with said time delayed signal to produce an optical interference signal having a frequency shift proportional to the rate of optical frequency change of said laser, and an optical frequency shifter including a second input for accepting said laser output signal and a third input for accepting said interference signal, the optical frequency shifter being configured and adapted for shifting the frequency of said laser output signal in response to said interference signal to stabilize the frequency of said laser output signal.

19. The system of claim 18 wherein said optical frequency shifter further comprises an AOM, said laser output signal traveling through said AOM to produce a stabilized output signal, a frequency correction signal being input to the AOM to shift the frequency of the laser output signal and thereby stabilize its frequency, said frequency correction signal being generated in response to said interference signal.

20. The system of claim 19 further comprising a detector detecting said optical interference signal and producing an electric signal representing said interference signal, said frequency correction signal being generated in response to said electric signal.

21. The system of claim 20 wherein said circuit further comprises an AOM through which a signal representing the laser output signal passes for interference by said time delayed version, said system further comprising:

an RF driver generating an RF drive signal, said RF drive signal outputted to said AOM to add the frequency of the RF drive signal to the frequency of the signal representing said laser output signal, and a mixer mixing said RF drive signal with said electric signal to produce an error signal, said frequency correction signal being generated in response to said error signal.

* * * * *